Figure 1:
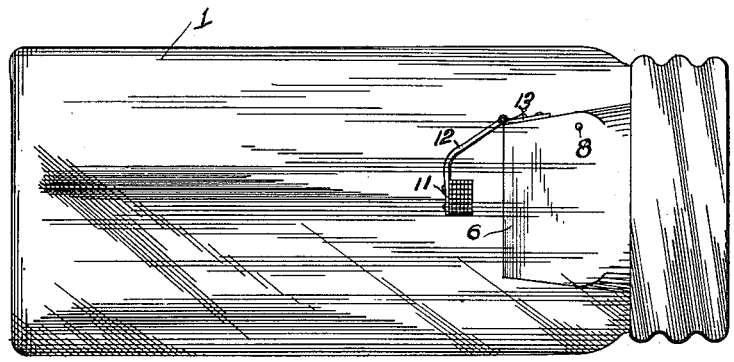

E. T. MARSH.
ANIMAL TRAP.
APPLICATION FILED FEB. 8, 1913.

1,138,132.

Patented May 4, 1915.
2 SHEETS—SHEET 1.

WITNESSES

INVENTOR:
E. T. Marsh
Attorney

E. T. MARSH.
ANIMAL TRAP.
APPLICATION FILED FEB. 8, 1913.

1,138,132.

Patented May 4, 1915.

2 SHEETS—SHEET 2.

WITNESSES
E. C. Duffy
R. R. Duffie

INVENTOR:
E. T. Marsh
Attorney

UNITED STATES PATENT OFFICE.

EDWIN T. MARSH, OF BERGEN, NEW YORK.

ANIMAL-TRAP.

1,138,132.

Specification of Letters Patent. Patented May 4, 1915.

Application filed February 8, 1913. Serial No. 747,013.

*To all whom it may concern:*

Be it known that I, EDWIN T. MARSH, a citizen of the United States, residing at Bergen, in the county of Genesee and State of New York, have invented certain new and useful Improvements in Animal-Traps, of which the following is a specification.

This invention relates to new and useful animal traps and is particularly designed as a mouse or rat trap.

The invention consists in the novel features of construction, combination and arrangement of parts illustrated in the drawings and more particularly pointed out in the appended claim.

Figure 2:
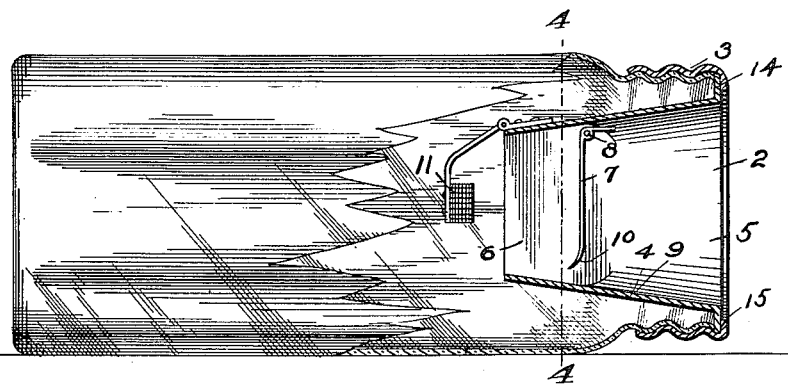
Figure 3:
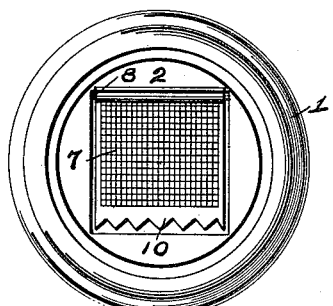
Figure 5:
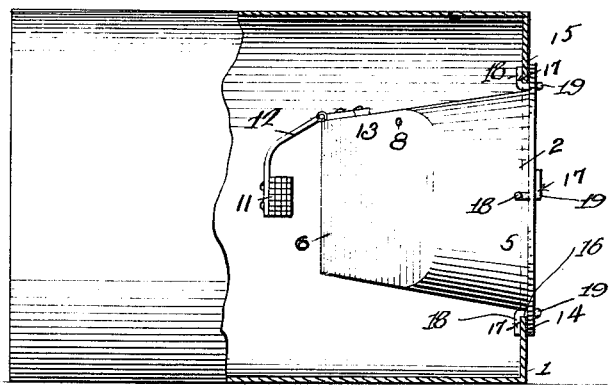
Figure 6:
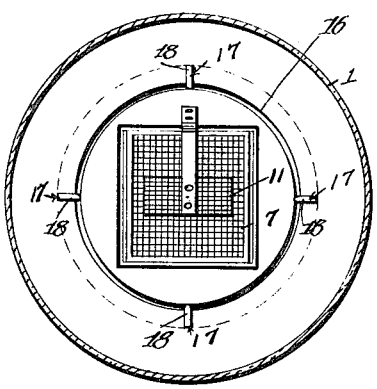
Figure 4:
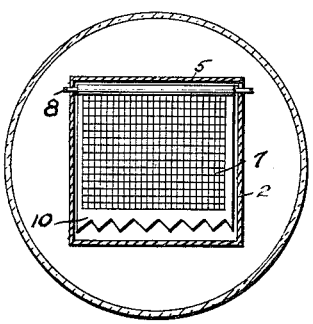
Figure 8:
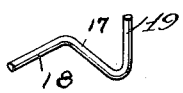
Figure 7:
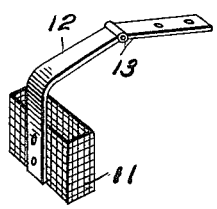

In the accompanying drawings:—Figure 1 is a side elevation, illustrating the application of the device to an ordinary fruit jar. Fig. 2 is a similar view, with the trap and a portion of the fruit jar shown in section. Fig. 3 is a front end view of Fig. 1. Fig. 4 is a vertical transverse section, taken on line 4—4 of Fig. 2, looking toward the trap-door. Fig. 5 is a side elevation showing the application of the trap to a tin can, a portion of which is shown in section. Fig. 6 is a transverse sectional view. Fig. 7 is a detail perspective view of the bait holder, and Fig. 8 a detail perspective view of one of the wire keepers or clamps used in holding the trap in place when applied to a tin can.

In practice, the trap is preferably applied to the ordinary fruit jar such as found in every household, but may be applied to a tin can, as shown in Figs. 5 and 6. Or by cutting a hole in a wooden box or door or partition to a tight room, the device may be held in place by small thumb screws.

Referring first to Figs. 1 and 2, which show the application of the trap to an ordinary fruit jar, 1 indicates the fruit jar and 2 the trap which is inserted in the mouth of the jar, as shown, and is held in place by the metal screw rim 3 of the jar top, it being understood that the glass top is left off.

The trap may be stamped out of thin sheet metal by suitable dies and made very rapidly and cheaply.

The trap comprises, specifically, a hollow casing 4 open at both ends, which is arranged longitudinally in the mouth of the fruit jar and gradually tapers in size from its outer to its inner end. As shown, the outer end 5 of the casing is circular in general outline, terminating in a square portion 6 at the inner end thereof.

A vertically arranged door 7 is mounted in the inner end of the trap casing, being hinged at its upper end to the bearing rod 8, extending transverely through opposite side walls 9 of the square inner end portion of the casing. The door is formed of reticulated material of suitable mesh and is provided at its lower end with a continuous series of downwardly projecting inwardly curved teeth 10. There is to be sufficient space beneath the lower end of the door to permit the animal to see through or pass its head or a portion of its body through in an effort to reach the bait, but not sufficient space to allow the animal to pass in and out of the trap.

The numeral 11 indicates the bait holder which is made of wire mesh or other suitable material and may be opened at its top, as shown in Fig. 7 to provide for inserting the bait. The bait is supported in the holder or bait box in front of the inner end of the casing of the trap and the bait box or holder is suspended in place by the arm 12, hinged at its upper end to the bearing plate or bracket 13, screwed or otherwise attached to the top of the casing.

The trap casing is provided at its front or outer end with an annular flange 14 which is clamped between the outer edge of the mouth of the fruit jar and the rim or flange 15 of the rim of the jar top.

In the construction shown in Figs. 5 and 6, the trap is shown applied to an ordinary tin can, being inserted through an opening 16 in the top of the can with its rim engaging the outer edge of the top. The trap is held in place by the wire clamps or keepers 17, the inner right-angularly bent portions 18 of which engage the inner edge of the top of the can, as shown in Figs. 5 and 6 and the outer right-angularly bent portions 19 of which engage the outer edge of the flange of the trap casing.

In practice, when the mouse, rat or other animal inserts its head or a portion of its body under the door 7 in an effort to reach the bait and then attempts to escape from the trap the teeth 10 engage the animal and the more the mouse or rat attempts to escape the tighter and more securely the teeth engage and hold the animal.

While the trap is more particularly designed for use in connection with fruit jars or tin cans, as previously explained, by cutting an opening in a wooden box or door or partition to a tight room, the device may be held in place by small thumb screws.

From the foregoing description taken in connection with the drawings it is thought that the construction and many advantages of my invention will be readily understood without requiring a more extended explanation.

Various changes in the form, proportions and minor details of construction may be resorted to without departing from the principles or sacrificing any of the advantages of this invention as defined in the appended claim.

Having described my invention, what I claim as new and desire to secure by Letters Patent, is:—

A trap of the type described including a receptacle, an open-ended inwardly converging tubular member having a square inner end with its outer end positioned at the entrance of said receptacle, a reticulated door pivotally hung in the square inner end of said tubular member and equipped with teeth at its lower edge, said toothed lower edge of the door being positioned adjacent the bottom of the tubular member, and a reticulate bait-suspending member upheld by an arm pivotally positioned from the inner end of said tubular member in alinement with the entrance of the trap.

In testimony whereof I affix my signature in presence of two witnesses.

EDWIN T. MARSH.

Witnesses:
GRACE M. ROWE,
ESTHER E. MARSH.